US012176168B2

(12) United States Patent
Guerrero

(10) Patent No.: US 12,176,168 B2
(45) Date of Patent: Dec. 24, 2024

(54) HIGH THERMAL CONDUCTIVITY FUSE HOLDER

(71) Applicant: Littelfuse, Inc., Chicago, IL (US)

(72) Inventor: Juan Antonio Guerrero, Coahuila (MX)

(73) Assignee: Littelfuse, Inc., Chicago, IL (US)

( * ) Notice: Subject to any disclaimer, the term of this patent is extended or adjusted under 35 U.S.C. 154(b) by 137 days.

(21) Appl. No.: 18/107,849

(22) Filed: Feb. 9, 2023

(65) Prior Publication Data

US 2024/0274391 A1 Aug. 15, 2024

(51) Int. Cl.
*H01H 85/165* (2006.01)
*H01H 85/143* (2006.01)

(52) U.S. Cl.
CPC ........ *H01H 85/165* (2013.01); *H01H 85/143* (2013.01)

(58) Field of Classification Search
CPC .... H01H 85/165; H01H 85/143; H01H 85/22; H01H 85/47–48; H01H 85/52–54; H01H 85/547–58; H01H 85/62
See application file for complete search history.

(56) References Cited

U.S. PATENT DOCUMENTS 2,091,424 A 8/1937 Triplett
4,390,225 A * 6/1983 Coyne .................. H01H 85/542 439/620.28
4,448,476 A * 5/1984 Perlman ............... H01H 85/542 439/620.28
4,981,448 A * 1/1991 Herbert ................ H01H 85/542 439/620.29
5,267,879 A * 12/1993 Oakley ................ H01H 85/542 439/620.28
6,275,135 B1 * 8/2001 Hibayashi .......... H01H 85/1755 337/252
2015/0296655 A1 * 10/2015 Luiten ................. H01L 23/3737 361/704
2016/0307720 A1 * 10/2016 Guillanton ............. H01H 85/24
2017/0365433 A1 12/2017 Hadler-Jacobsen
2020/0229326 A1 * 7/2020 Kvarnstrand ...... H05K 7/20218

FOREIGN PATENT DOCUMENTS

CN 110660626 A 1/2020
JP 2022110598 A 7/2022

OTHER PUBLICATIONS

Extended European Search Report for EP Application No. 24155-148.0, dated Sep. 30, 2024, 8 pages.

* cited by examiner

*Primary Examiner* — Jacob R Crum
(74) *Attorney, Agent, or Firm* — KDW Firm PLLC

(57) ABSTRACT

A fuse holder includes a housing and a knob. The housing has a telescoping chamber designed to receive a knob terminal, where the knob terminal is adapted to receive a fuse. The knob has a neck which is inserted into the telescoping chamber to enclose the cylindrical fuse. The housing and neck are made of a polymer having a thermal conductivity in a range of 4.0 to 10 W/mK.

16 Claims, 16 Drawing Sheets

HIGH THERMAL CONDUCTIVITY FUSE HOLDER

FIELD OF THE DISCLOSURE

Embodiments of the present disclosure relate to fuse holders and, more particularly, to fuse holders that are able to conduct heat.

BACKGROUND

Used in electrical systems to protect against excessive current, fuses are sacrificial devices which break when an overcurrent condition occurs. Fuses include a fuse element, such as a metal wire or strip, that links two metal contact terminals together, and which melts/breaks if too much current flows. The breakage causes an open circuit, thus protecting devices to which the fuse is connected. Fuses come in a variety of shapes and sizes and have many applications, from small circuit electronics to large-scale industrial applications. In addition to being a component protection device, fuses are also safety devices, such as when used in vehicles, as they protect against fires in response to vehicle accidents.

The fuse element may be contained in a housing, such as glass or ceramic, and surrounded by sand. Additionally, the fuse may be contained in a fuse holder that facilitates installation of the fuse (e.g., in a panel). Such fuse holders are limited for high current applications, due to their inability to dissipate the heat generated by the fuse inside the fuseholder. While the fuse holder may manage debris flow from the breaking fuse, the fuse holder is not designed to manage the thermal energy of the fuse. The inability to manage the excess heat during normal working operation at elevated current requirements limits the ability to manufacture fuses with a high voltage rating.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a fuse holder in accordance with the present disclosure may include a housing and a knob. The housing has a telescoping chamber designed to receive a knob terminal of the knob, which holds a fuse. The knob has a neck which is inserted into the telescoping chamber to enclose the fuse. The housing and neck are made of a polymer having a thermal conductivity in a range of 4.0 to 10 W/mK.

Another exemplary embodiment of a fuse holder in accordance with the present disclosure may include a knob and a housing. The housing includes a telescoping chamber, a cylindrical head, a first slot, and a second slot. The telescoping chamber holds a knob terminal that is capable of receiving a fuse. The cylindrical head is adjacent the telescoping chamber and receives the knob so as to enclose the telescoping chamber. Perpendicular to the telescoping chamber, the first slot holds a first terminal. The second slot holds a cylindrical section of a second terminal. The housing and the knob are made of a polymer having a thermal conductivity in a range of 4.0 to 10 W/mK.

DETAILED DESCRIPTION

A fuse holder is disclosed herein for holding a high-current cylindrical fuse. The fuse holder has a housing with a telescoping chamber and a knob to be inserted into an opening of the housing and enclose the telescoping chamber. The housing has two slots, one for receiving a first terminal having two orthogonal sections, and the other for receiving a second terminal having a cylindrical portion at one end. The housing further features a terminal pathway through which a protruding portion of the second terminal is fed so that the terminal is adjacent the part of the chamber holding the cylindrical fuse. Once installed into their dedicated slots, the two terminals are disposed on either end of the cylindrical fuse. The housing and knobs are made of a high thermal conductivity polymer to move heat away from the fuse during an opening event. Further, the housing and knob of the fuse holder each feature fins radiating axially outward from their surfaces, thus providing an additional mechanism for heat dissipation. The novel fuse holder is thus able to support high-current fuses not available with legacy fuse holders.

For the sake of convenience and clarity, terms such as "top", "bottom", "upper", "lower", "vertical", "horizontal", "lateral", "transverse", "radial", "inner", "outer", "left", and "right" may be used herein to describe the relative placement and orientation of the features and components of the fuse holder, each with respect to the geometry and orientation of other features and components appearing in the perspective, exploded perspective, and cross-sectional views provided herein. Said terminology is not intended to be limiting and includes the words specifically mentioned, derivatives therein, and words of similar import.

Figure 1:
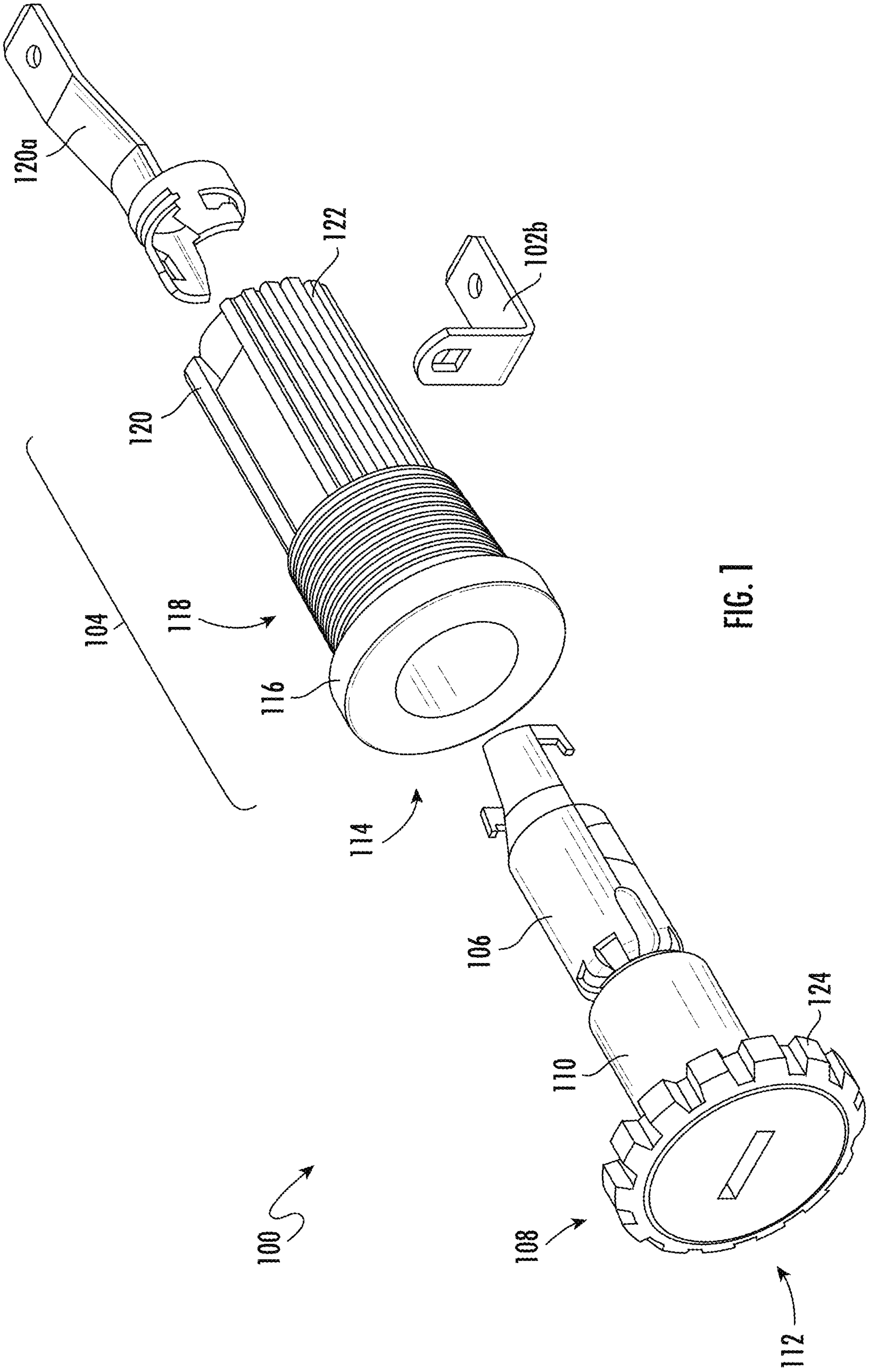
FIG. 1 is a diagram illustrating a fuse holder, in accordance with exemplary embodiments.

FIG. 1 is a representative drawing of a fuse holder 100 for supporting a fuse, according to exemplary embodiments. The fuse holder 100 may include a pair of terminals 102*a* and 102*b* (collectively, "terminals 102"), a housing 104, and a knob 108 for holding a knob terminal 106, where the knob terminal 106 is for holding a fuse. In some embodiments, the knob terminal 106 is cylindrical and fits into an opening 114 of the housing 104, after which the knob 108 is secured to the housing 104. In exemplary embodiments, the housing 104 features a cylindrical chamber adapted to receive the knob terminal 106. The knob 108 closes a telescoping chamber inside the housing 104, thus securing the fuse in a closed cavity.

In exemplary embodiments, the fuse holder 100 is designed to conduct heat away from the fuse during normal operation. When too much heat builds up during normal operation, the fuse may prematurely break. In exemplary embodiments, the fuse holder 100 is designed to work at a nominal current (with fuses of high current application) without a premature breaking event occurring. The fuse is designed to open on an overcurrent condition, where the opening disrupts the flow of current and therefore protects a circuit to which the fuse is connected from receiving the excess current.

Applications supporting high-current (e.g., greater than 20 Amps) cartridge fuses are installed inside fuse holders. The fuse holder 100 has the ability to dissipate heat produced by the fuse through the housing 104 and knob 108, rather than just through the metallic terminals 102, as is the characteristic of legacy fuse holder designs. To facilitate robust heat dissipation, the housing 104 and knob 108 are made of a polymer material having high thermal conductivity in a range of 4.0 to 10 Watts per meter Kelvin (W/mK). The housing 104 and knob 108 thus act as a heat sink instead of using expensive metals such as copper and aluminum.

In exemplary embodiments, the knob 108 of the fuse holder 100 includes a neck 110 that defines a hollow cylindrical chamber that holds one end of the knob terminal 106. The knob 108 also includes a slot 112 which may optionally receive a screwdriver for securing the knob to the housing 104. Alternatively, the knob 108 may be secured to the housing 104 by hand, by rotating the knob as the neck 110 slides into the opening 114 of the housing 104. The present disclosure is not limited in this regard.

The housing 104 features a head 116, screw threads 118, and a body 120, all of which are cylindrical, with the screw threads 118 being between the head 116 and the body 120. In a non-limiting embodiment, the head 116 has a diameter that is larger than the body 120. In exemplary embodiments, the body 120 features one or more longitudinally extending fins 122. The fins 122 radiate from an outside surface of the body 120 of the housing 104. Similarly, in exemplary embodiments, the knob 108 features one or more fins 124. The fins 124 radiate from an outside surface of the knob 108. The fins 122 and 124 have the effect of increasing the surface area of the housing 104 and knob 108, respectively, similar to the designs of heat sinks, which helps move heat away from the knob terminal 106.

Thus, in addition to being made from a polymer material with high thermal conductivity (4.0 to 10 W/mK), the fins 122 of the housing 104 and the fins 124 of the knob are a design feature that functions as a heat sink and helps to radiate the heat and keeps the fuse body cooler. These features enable the fuse holder 100 to quickly conduct heat away from the knob terminal 106 during and following an opening event. The fuse holder 100 may thus be suitable for high-current applications because heat is dissipated, not just through the terminals, but through the polymer material making up the fuse holder, as well as through the fins 122 and 124 located on the housing 104 and knob 108, respectively.

Figure 2A:
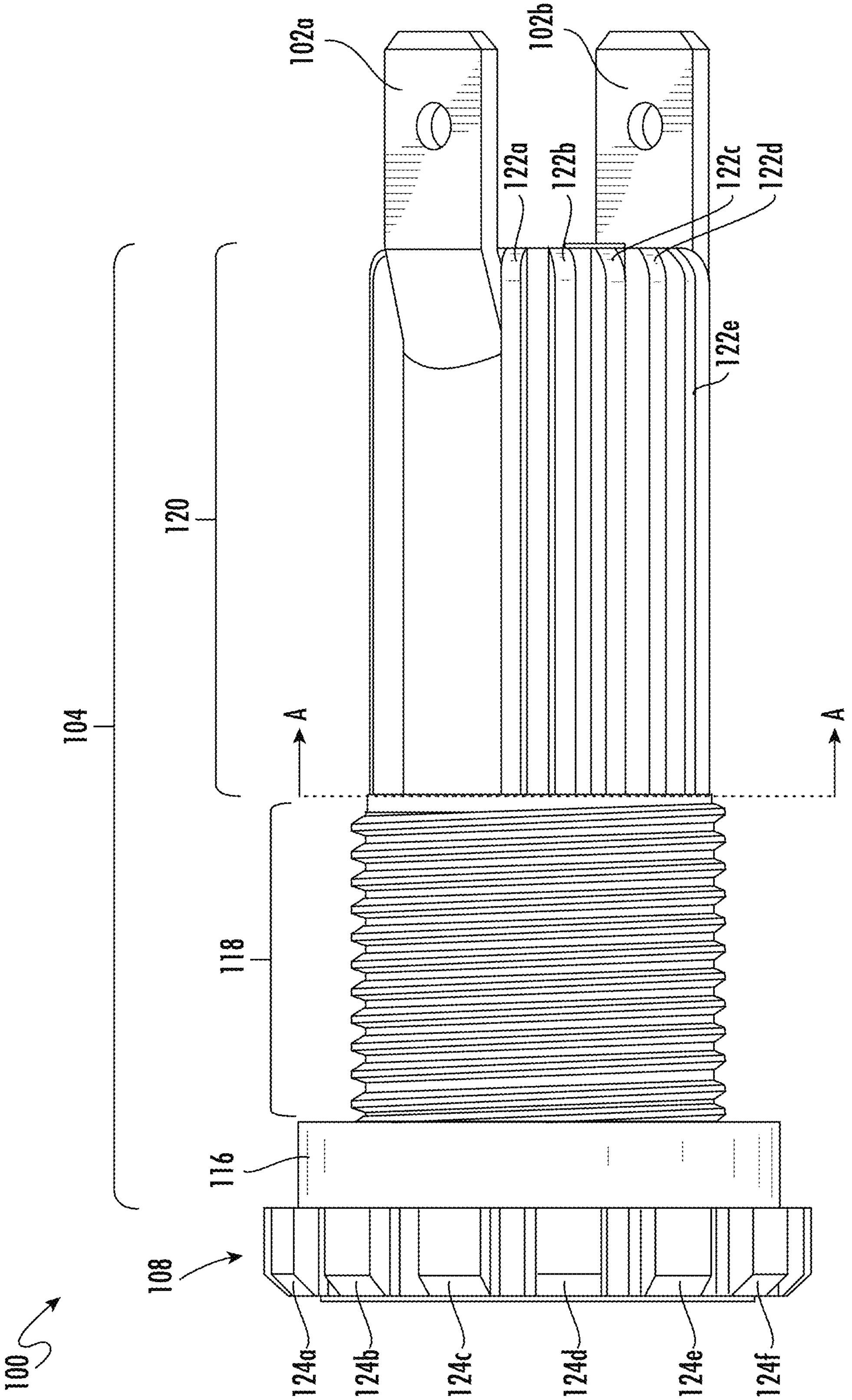
FIGS. 2A-2C are diagrams illustrating the fuse holder of FIG. 1, in accordance with exemplary embodiments.
Figure 2B:
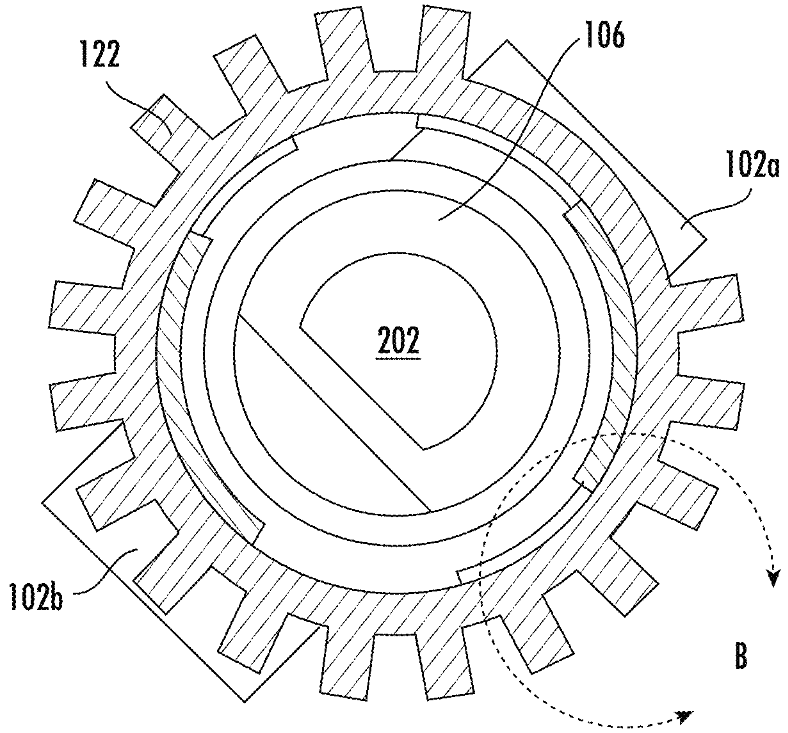
Figure 2C:
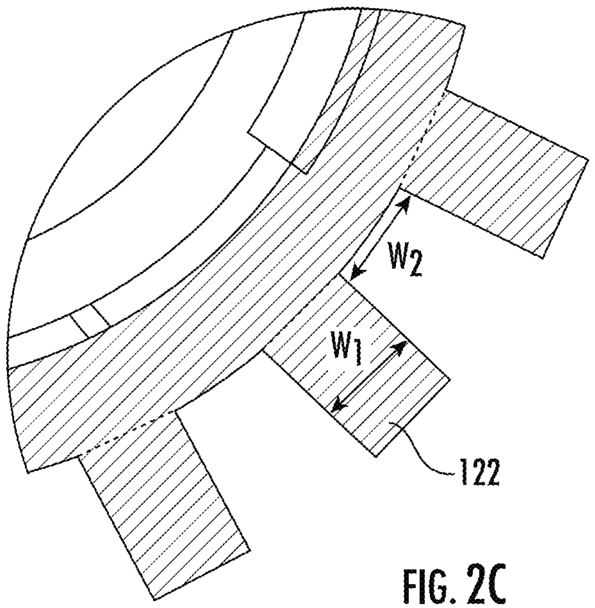

FIGS. 2A-2C are representative drawings of the fuse holder 100, according to exemplary embodiments. FIG. 2A is a side view, FIG. 2B is a cross-sectional view at location A-A of FIG. 2A, and FIG. 2C is a detail view at B of FIG. 2B. The housing 104, including the head 116, screw threads 118, and body 120, are shown. Some portion of the body 120 features fins 122, with fins 122*a-e* being visible in FIG. 2A. The knob 108 features fins 124, with fins 124*a-f* being visible. The cylindrical neck 110 of the knob 108 is not visible, as the neck 110 is inserted into the head 116 until the knob 108 with the knob terminal 106 is locked with terminal 102*a*. In exemplary embodiments, once the knob 108 with knob terminal 106 is loaded with the fuse, the assembly is inserted into the neck 110 (FIG. 1) and locked (knob terminal 106 with terminal 102*a*), then the complete fuse holder 100 can be installed from the front side to a panel and a nut can be installed over the screw threads 118 from the back of the panel.

FIG. 2B is a cross-sectional view of the fuse holder 100 at location A-A of FIG. 2A. Terminals 102*a* and 102*b* are indicated. As shown in FIG. 1, the terminals 102*a* and 102*b* are different from one another, as terminal 102*a* is disposed on one side of the fuse that is farthest from the end of the housing (e.g., where the terminals extend outward from the body 120). The fins 122 substantially surround the housing 104 of the fuse holder 100, except in one location, where the manufacturing brand, markings, and ratings are disposed. The terminals 102 are made of electrically conductive material, such as copper, silver, or alloys of these metals, and they also conduct heat (better than the polymer material making up the housing 104). The remaining portion of the cylindrical body 120 is surrounded by the fins 122. The housing 104 is molded and, in some embodiments, has fins surrounding the entire surface. This is preferred where the manufacturing brand, markings, and ratings can be otherwise located, such as on the knob 108.

The detail view of the fins 122 in FIG. 2C show that the fins are of similar size and evenly spaced apart. In a non-limiting embodiment, the width, $w_1$, of each fin 122 is approximately the same as the distance, $w_2$, between fins, or $w_1 \approx w_2$. The dashed lines in FIG. 2C show that, without the fins 122, the surface area of the housing 104 would be substantially smaller. The fins 122 thus provide additional surface area to enable heat transfer from the fuse to take place.

Figure 3:
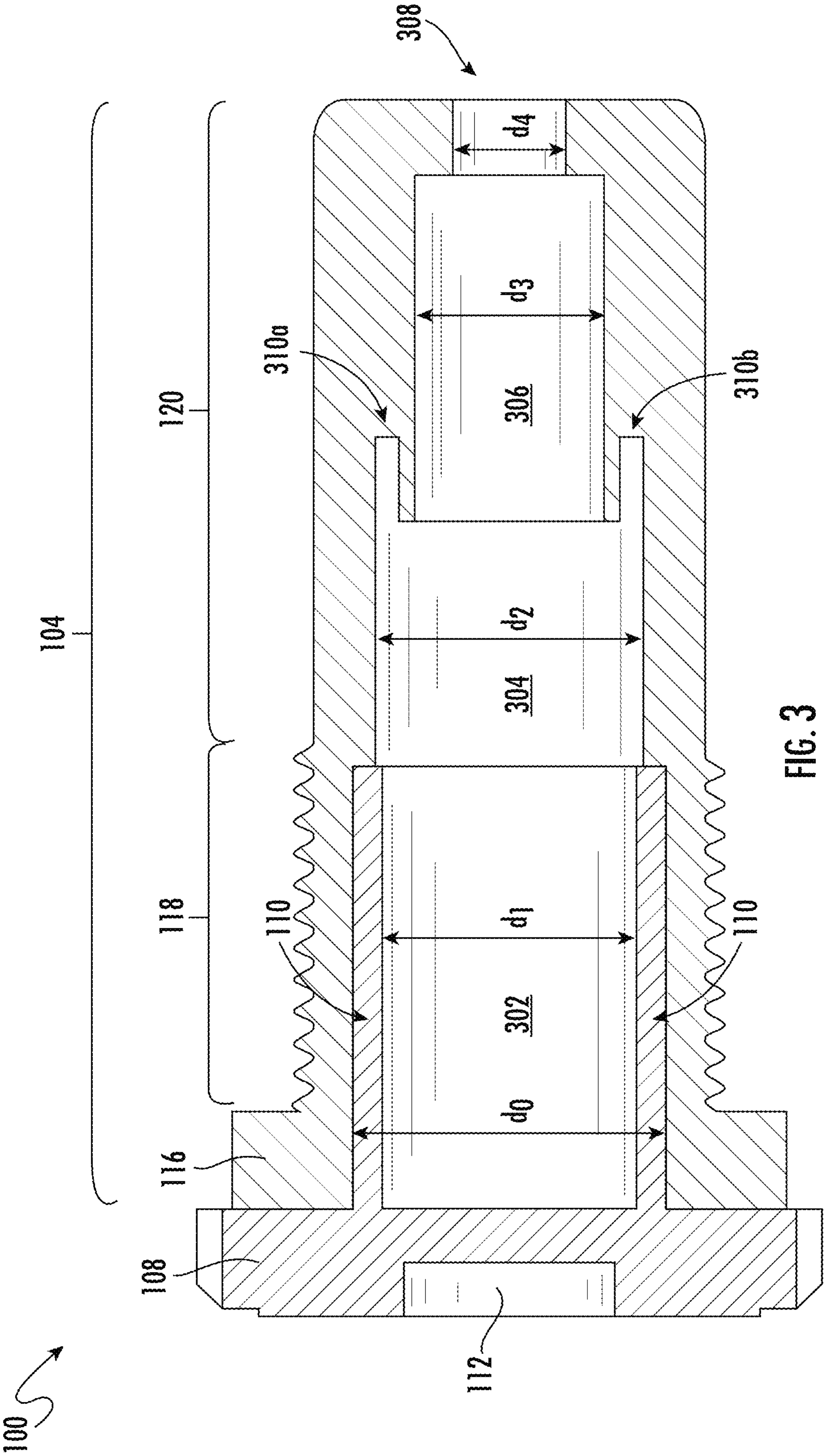
FIG. 3 is a diagram illustrating the fuse holder of FIG. 1, in accordance with exemplary embodiments.

FIG. 3 is a representative drawing of the fuse holder 100, according to exemplary embodiments. The side cross-sectional view shows the interior of the housing 104 with the knob 108 inserted therein. In exemplary embodiments, the interior of the housing 104 is divided into four cylindrical chambers, 302, 304, 306, and 308. The four chambers 302, 304, 306, and 308 form a single, telescoping chamber. Chamber 302 is where the neck 110 resides once the knob 108 of the fuse holder 100 is inserted into the housing 104. The chamber 302 has a diameter, $d_0$, and, in exemplary embodiments, the neck 110 also has a cylindrical chamber with a diameter, $d_1$, where $d_1 < d_0$. When the knob 108 is inserted into the housing 104, the neck 110 should fit into the chamber 302 easily but, in some embodiments, is snug against the walls of the chamber 302. Chamber 302 is also proximate the screw threads 118, located on the outside of the housing 104.

Chamber 304 is adjacent chamber 302 and has a diameter, $d_2$. Chamber 306 is adjacent chamber 304, with chamber 304 being in between chambers 302 and 306, and has a diameter, $d_3$. In exemplary embodiments, the fuse will be located in the chamber 306. Chamber 308 is disposed at an end of the housing 104, opposite the knob 108, and adjacent the chamber 306, with chamber 306 being between chambers 304 and 308, with chamber 308 having a diameter, $d_4$. In exemplary embodiments, the chambers form a telescoping configuration, with $d_0 > d_2 > d_3 > d_4$.

Figure 5A:
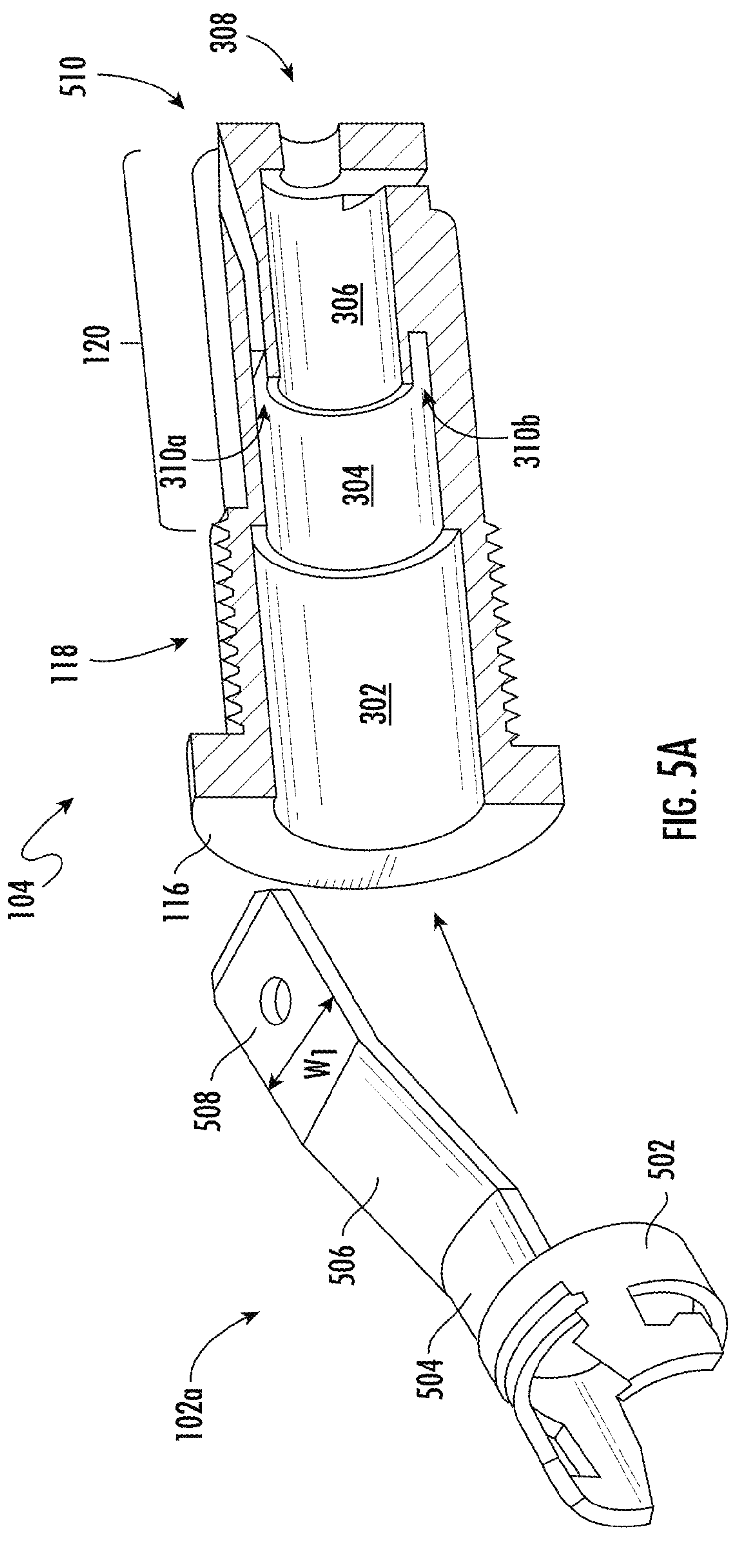
FIGS. 5A-5C are diagrams illustrating insertion of a second terminal for the fuse holder of FIG. 1, in accordance with exemplary embodiments.

At one end distal to chamber 302 and part of chamber 304 are cylindrical slot portions 310*a* and 310*b*, which are, in fact, a single cylindrical structure, known herein as the cylindrical slot 310, which surrounds the chamber 306 but is still part of the chamber 304. The cylindrical slot 310 can be thought of as an extension of the second chamber 304 that surrounds the third chamber 306. As further shown and described below in FIGS. 5A-5C and 6A-6B, the terminal 102*a* has a cylindrical section 502 at one end and a protruding section 508 (FIG. 5A). The protruding section 508 of the terminal 102*a* is inserted through chamber 302, which then passes through chamber 304, then passes through a dedicated terminal pathway 510, with the protruding section 508 ending up outside the housing 104. In exemplary embodiments, the terminal pathway 510 is a cavity that extends from the chamber 304 to outside the housing 104. As the terminal 102*a* is inserted through the terminal pathway 510, the cylindrical section 502 ends up at the end of the chamber 304 and fits into the cylindrical slot 310. In exemplary embodiments, the cylindrical section 502 of the terminal 102*a* has approximately the diameter, $d_2$, of the chamber 304.

Figure 4A:
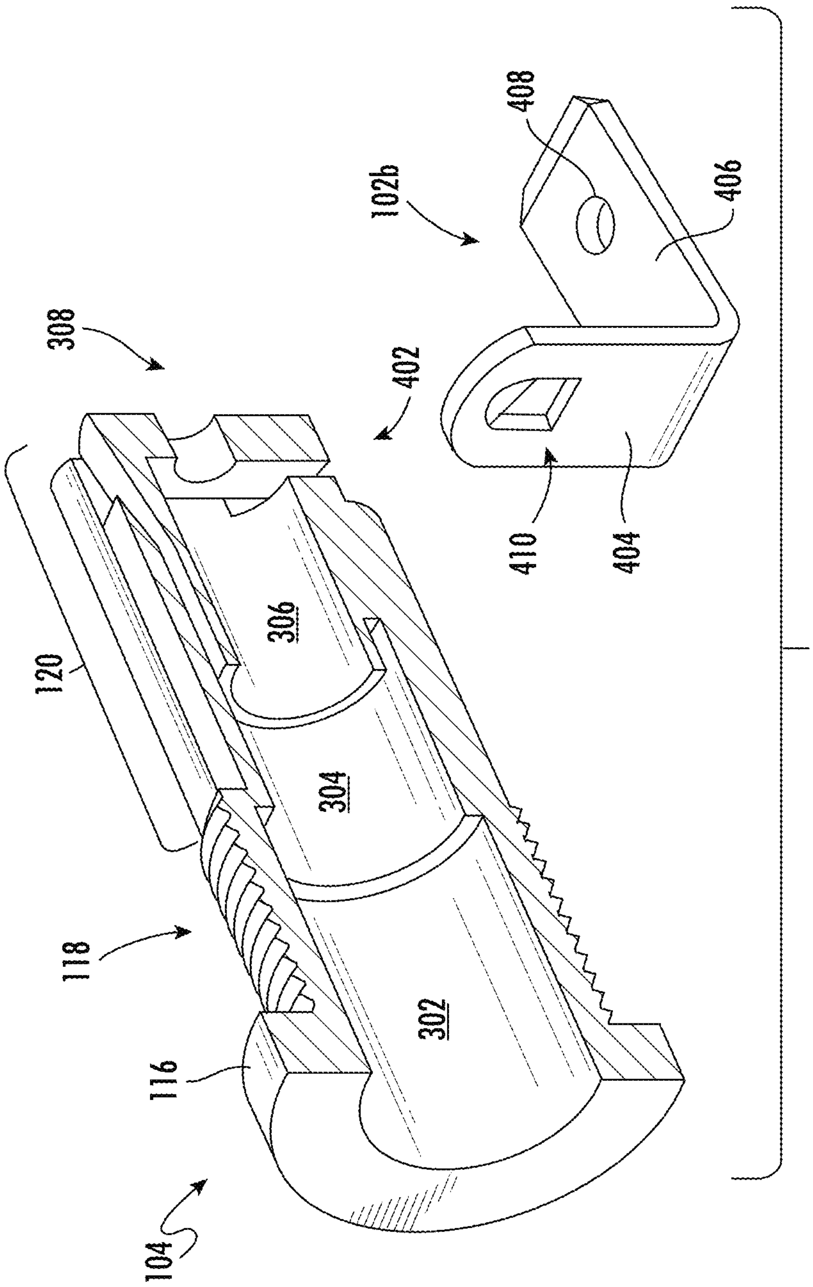
FIGS. 4A-4C are diagrams illustrating insertion of a first terminal for the fuse holder of FIG. 1, in accordance with exemplary embodiments.
Figure 4B:
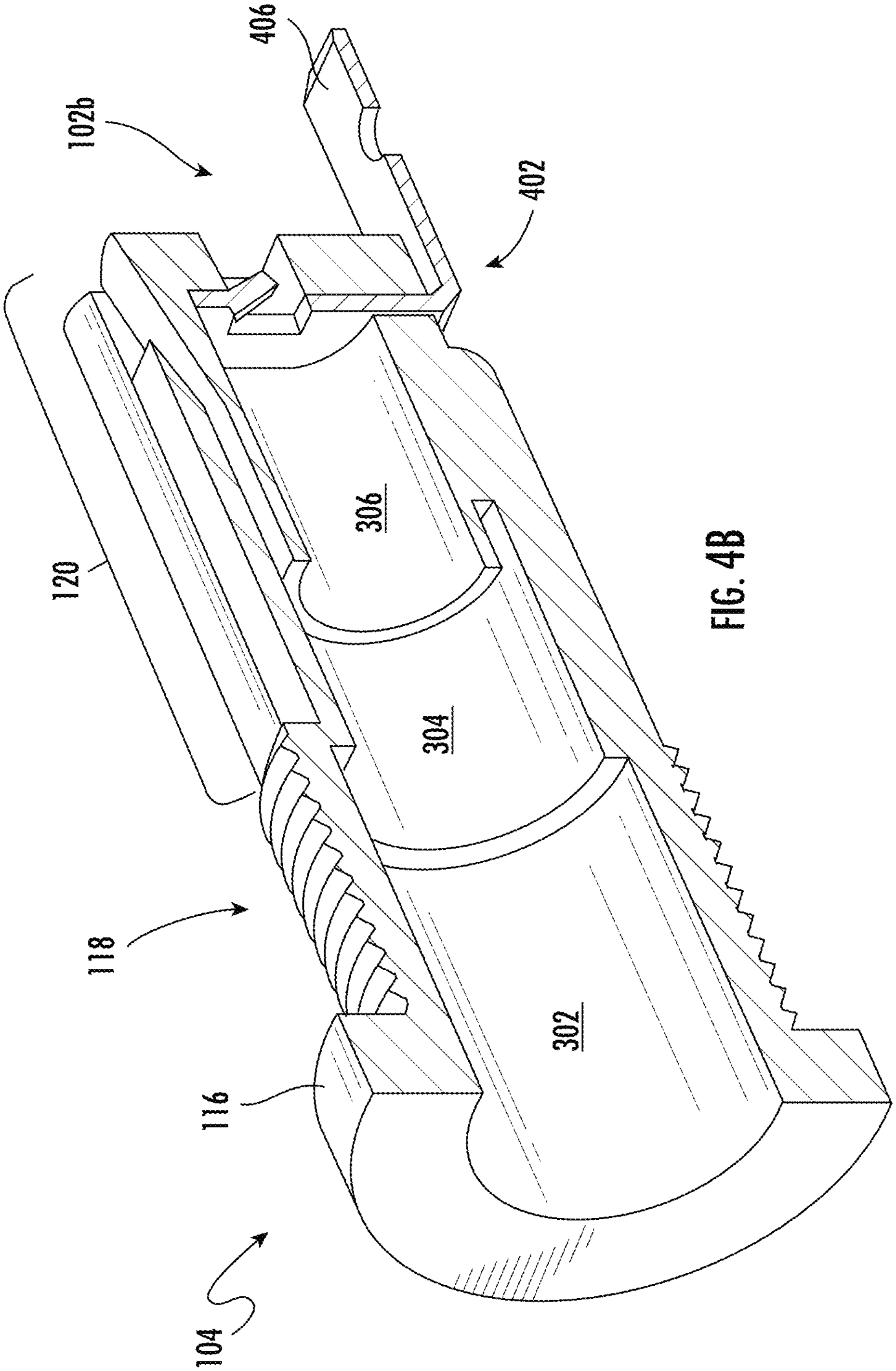
Figure 4C:
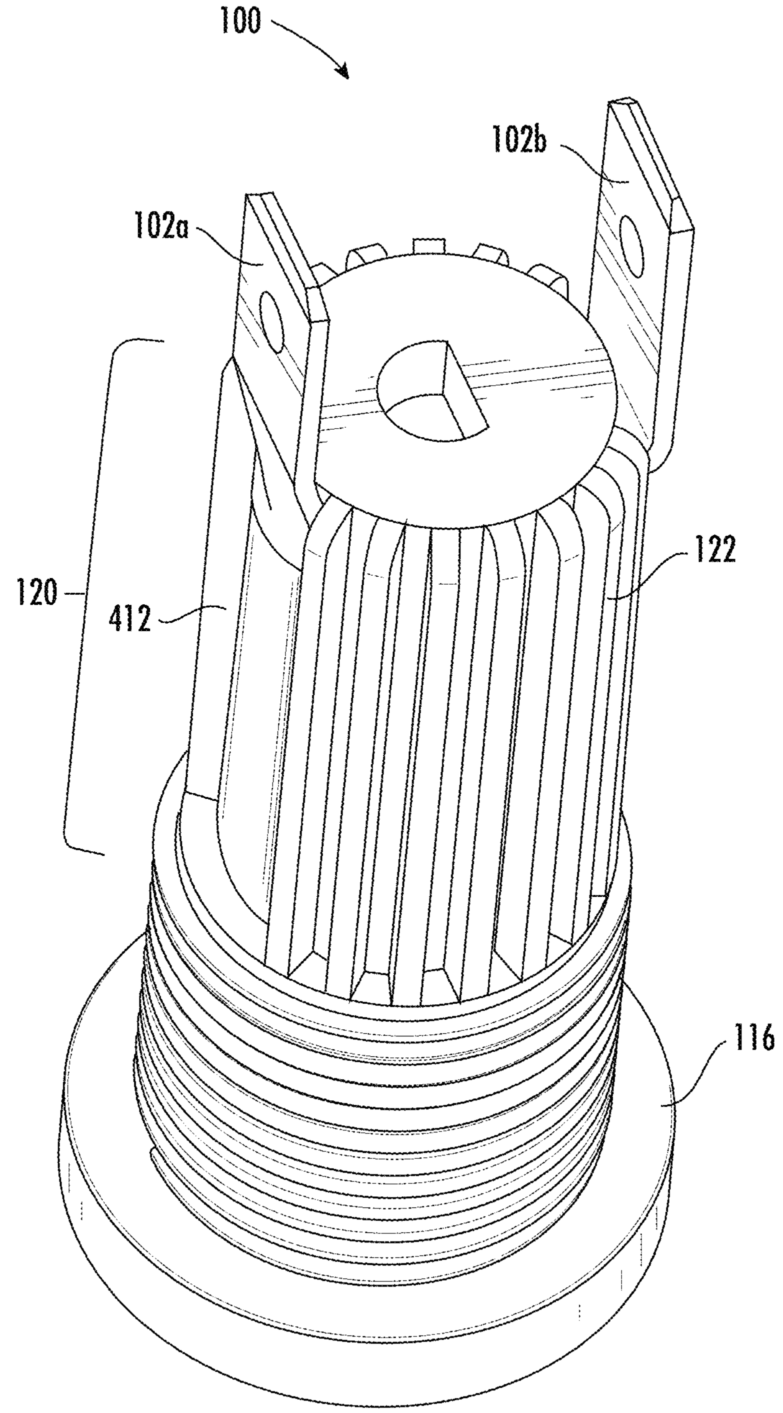

FIGS. 4A-4C are representative drawings of the housing of the fuse holder 100 with the terminal 102*b*, according to exemplary embodiments. FIG. 4A is a perspective cross-sectional view of the housing with the terminal 102*b* not inserted, FIG. 4B is a perspective cross-sectional view of the housing with the terminal 102*b* inserted, and FIG. 4C is a perspective view of the fuse holder 100 with both terminals 102 installed. In the cross-sectional views, external parts of the housing 104, the head 116, screw threads 118, and body 120, are shown, as well as the interior chambers 302, 304, 306, and 308.

In exemplary embodiments, a slot 402 for receiving the terminal 102*b* is disposed between chambers 306 and 308. The slot 402 is orthogonal to the chambers and parallel to the head 116. The terminal 102*b* features two orthogonally disposed portions: a slot section 404 and a protruding section 406. The slot section 404 includes a fuse aperture 410 for receiving one end of the cylindrical fuse and the protruding section 406 includes an aperture 408 for connecting the terminal 102*b* externally. The aperture 408 is under a global standard and may be connected to a quick connector terminal, but may also be soldered to a wire. The fuse aperture 410 is a lock system. Once ther terminal 102*b* is inserted, slot section 404 is inserted into slot 402 the fuse aperture 410 lock system engages into the diameter of chamber 308 and locks the terminal 102*b* into position. The terminal 102*a* includes a similar aperture, discussed in more detail below.

In exemplary embodiments, the slot section 404 of the terminal 102*b* is inserted into the slot 402. In exemplary embodiments, the fuse (not shown) will be disposed within the chamber 306. In the cross-sectional view of FIG. 4B, the terminal 102*b* is in position in the slot 402, with the protruding section 406 disposed external to the housing 104. The terminal 102*b* is shown in the fuse holder 100 (FIG. 4C), with the terminal 102*a* being opposite the terminal 102*b*. An unfinned portion 412 of the outer surface of the body 120 of the housing 104 is shown.

Figure 5B:
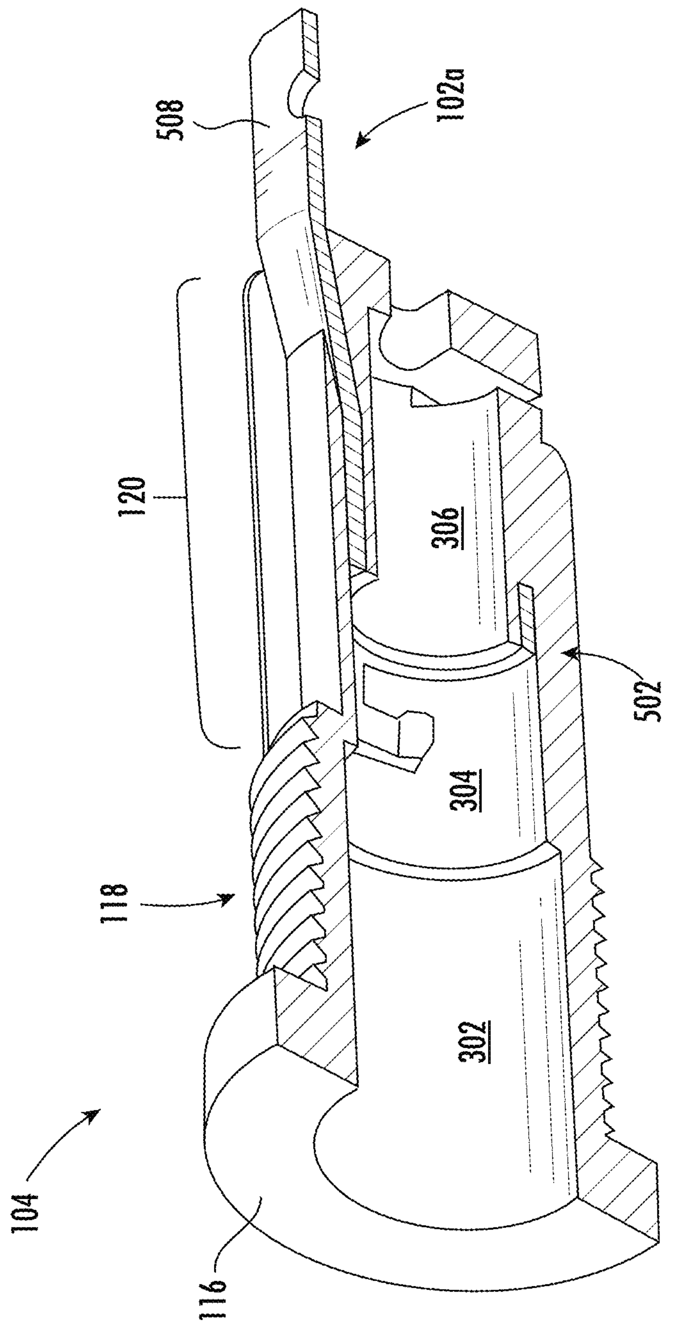
Figure 5C:
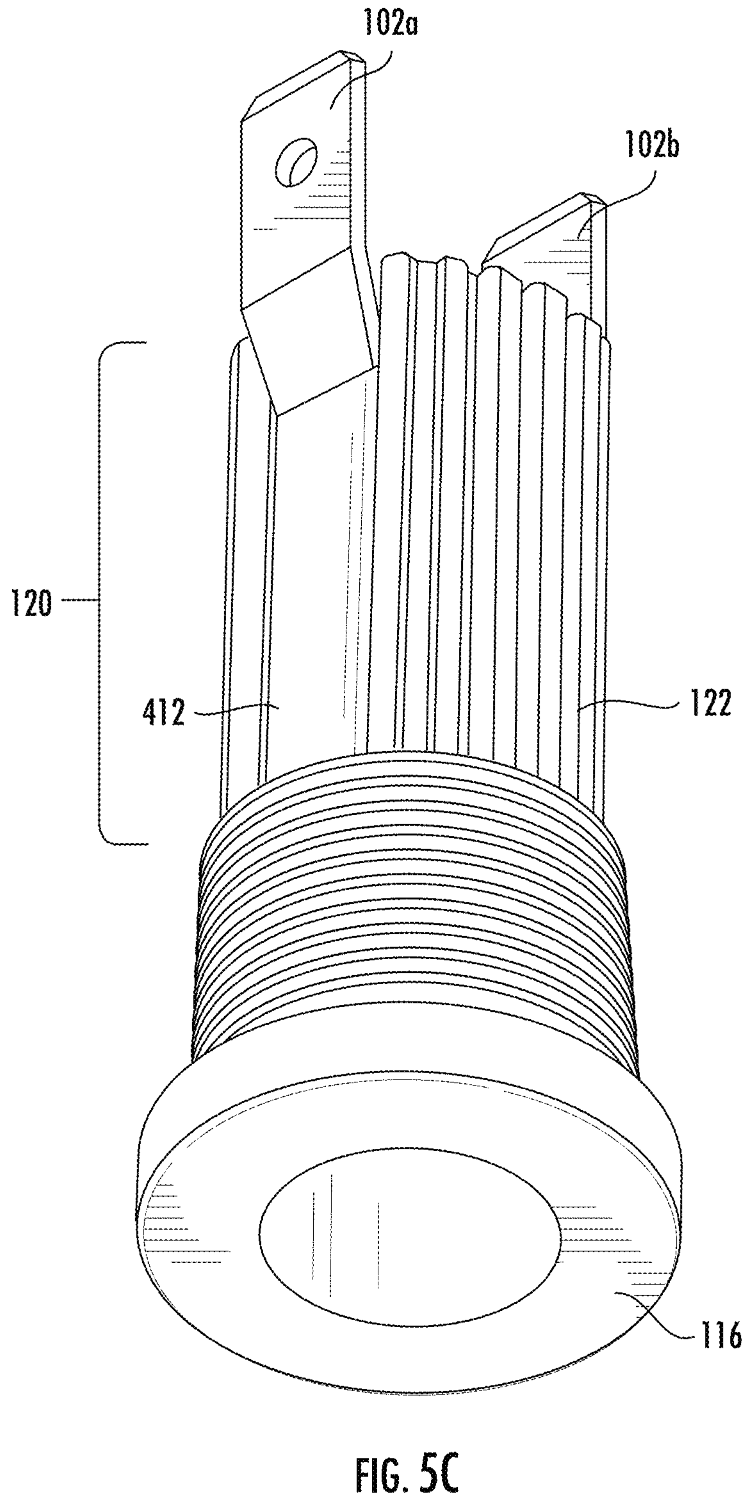

FIGS. 5A-5C are representative drawings of the housing of the fuse holder with the second terminal, according to exemplary embodiments. FIG. 5A is a perspective cross-sectional view of the housing with the second terminal not inserted, FIG. 5B is a perspective cross-sectional view of the housing with the second terminal inserted, and FIG. 5C is a perspective view of the housing with both terminals installed. In the cross-sectional views, external parts of the housing 104, the head 116, screw threads 118, and body 120, are shown, as well as the interior chambers 302, 304, 306, and 308. Also shown in FIG. 5A, the terminal 102*a* features the cylindrical portion 502 and the protruding section 508, already discussed above, as well as a neck 504 and an angled portion 506. Recall that the protruding section 508 of the terminal 102*a* is inserted through chamber 302, which then passes through chamber 304, then passes through a dedicated terminal pathway 510, with the protruding section 508 ending up outside the housing 104 and the cylindrical section 502 being disposed between the chambers 304 and 306, with some portion of the cylindrical section residing in the chamber 304. The cylindrical section 502 also fits into the cylindrical slot 310.

In exemplary embodiments, the protruding section 508 has a width, $w_1$. In some embodiments, the angled section 506 and the neck 504 have the width, $w_1$. The terminal 102*a* is inserted into the housing 104 as indicated by the arrow (FIG. 5A). In exemplary embodiments, the width, $w_1$, is smaller than or equal to the diameter, $d_2$, of the chamber 304, since the protruding section 508 traverses the chamber to the outside of the housing 104 ($w_1 \leq d_2$). As the terminal 102*a* is fed through the chambers 302, 304, and into the terminal pathway 510, the cylindrical portion 502 fits into the cylindrical slot 310 indicated by the slot portions 310*a* and 310*b*. The cylindrical slot 310 secures the terminal 102*a* in place.

In the cross-sectional view of FIG. 5B, the cylindrical portion 502 of the terminal 102*a*, whose diameter is orthogonal to the neck 504, angled portion 506, and protruding section 508, bisects the two chambers 304 and 306 of the housing 104, although some of the cylindrical portion 502 resides in the chamber 304. Since the fuse (not shown) will reside in the chamber 306, with the terminal 102*b* connected to one end of the fuse, the cylindrical portion 502 of the terminal 102*a* will be connected to the knob terminal 106 of the knob 108, in exemplary embodiments. Further, the neck 504 and angled portion 506 will be disposed outside the chamber 306 but inside and adjacent to the unfinned portion 412 of the body 120.

Figure 6A:
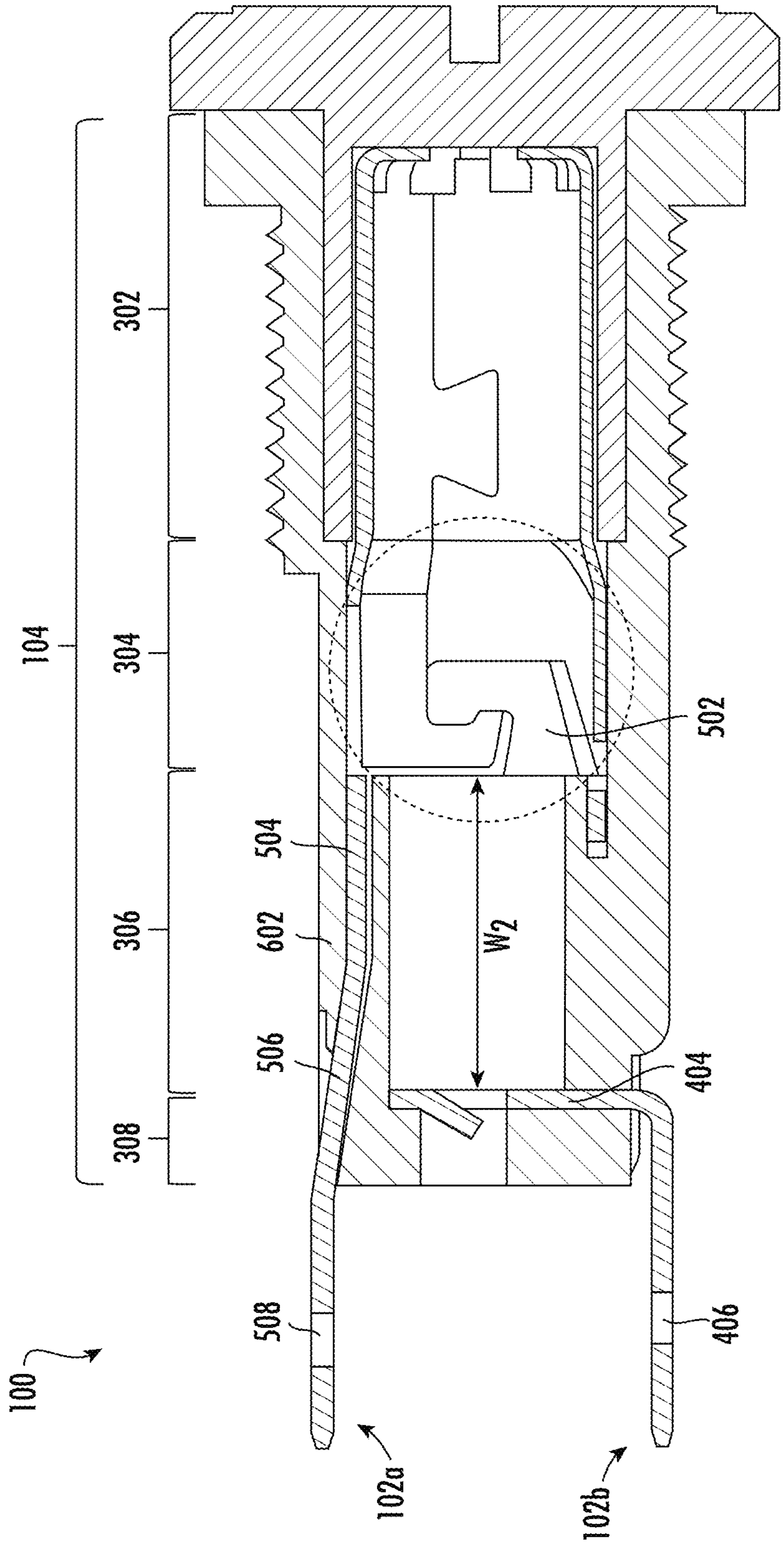
FIGS. 6A-6C are diagrams illustrating the terminals for the fuse holder of FIG. 1, in accordance with exemplary embodiments.
Figure 6B:
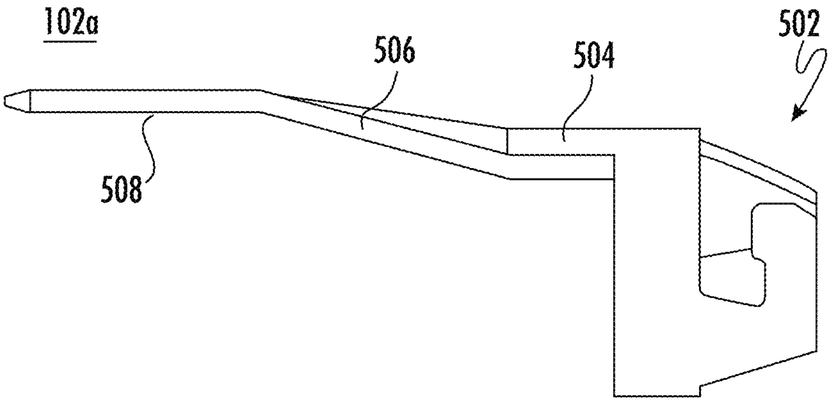
Figure 6C:
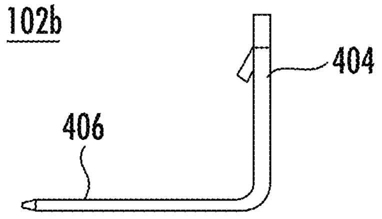

FIGS. 6A-6C are representative drawings of the terminals of the fuse holder 100, according to exemplary embodiments. FIG. 6A is a side transparent view of the fuse holder 100 with both terminals in place, FIG. 6B is a side view of terminal 102*a*, and FIG. 6C is a side view of terminal 102*b*. At the top of FIG. 6A, the location of the chamber 302, chamber 304, chamber 306, and chamber 308 are shown. The terminals 102 are also indicated, with the slot section 404 of terminal 102*b* bisecting chambers 306 and 308 and the protruding section 404 extending laterally outward from the end of the fuse holder 100. Cylindrical section 502 of terminal 102*a* is located in chamber 304, neck section 504 is located adjacent to chamber 306, angled section 506 is located adjacent to both chambers 306 and 304, and protruding section 508 is disposed outside the housing 104 of the fuse holder 100. Further, neck section 504 is disposed between chamber 306 and outside surface 602 of the housing 104. As shown in the dashed circle (FIG. 6A), the cylindrical section 502 of the terminal 102*a* is engaged with the knob terminal 106.

The chamber 306 has width, $w_2$, for supporting the fuse. The slot section 404 of terminal 102*b* is disposed on one side of the chamber 306, to be connected to the fuse. Thus, the fuse holder 100 is designed so that the fuse has terminals on either side, the ends of which (e.g., protruding sections 406 and 508) extend laterally to the outside of the fuse holder.

Figure 7A:
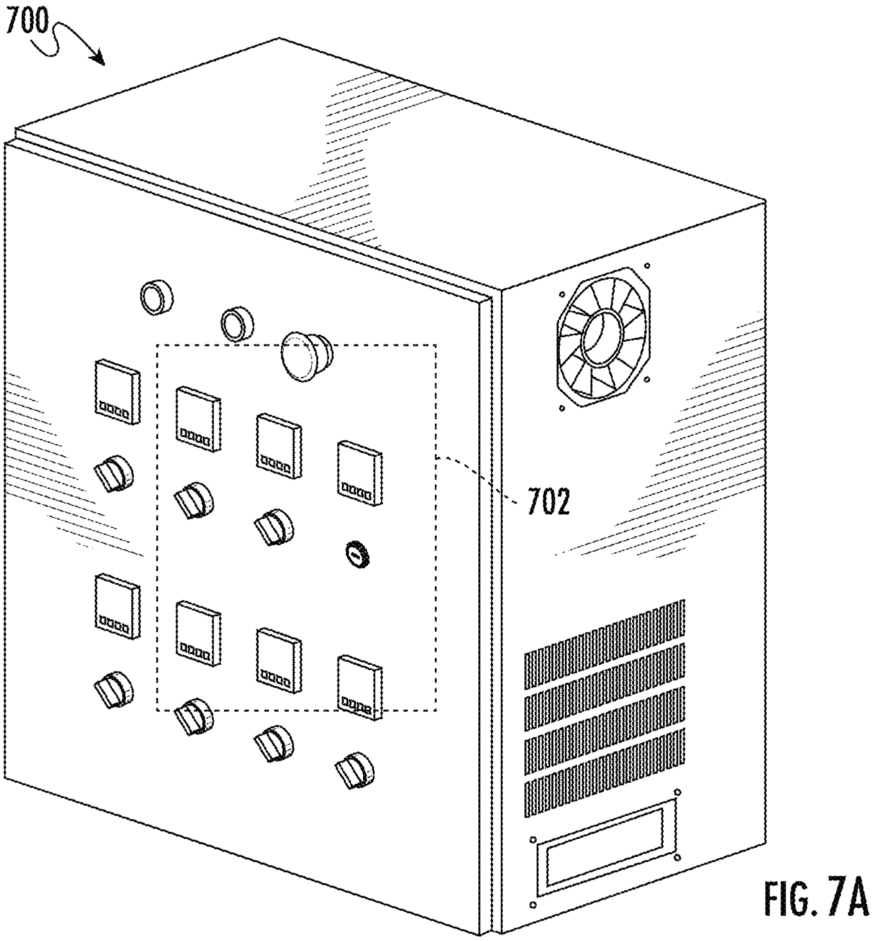
FIGS. 7A-7E are diagrams illustrating a control panel for supporting the fuse holder of FIG. 1, in accordance with exemplary embodiments.
Figure 7B:
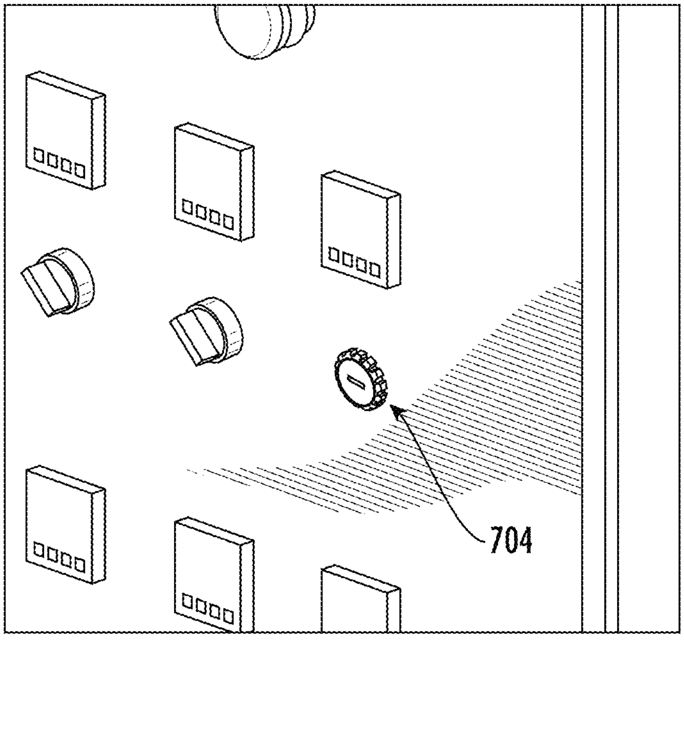
Figure 7C:
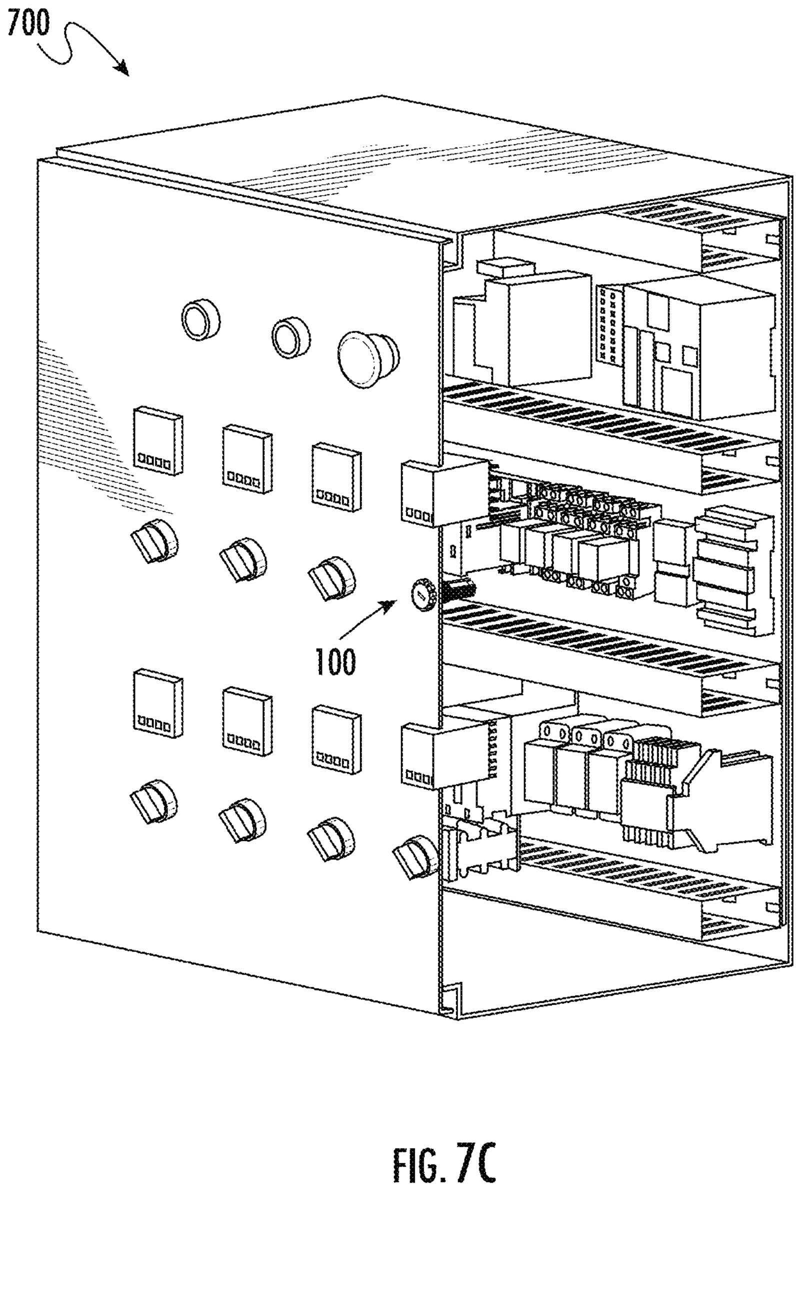
Figure 7D:
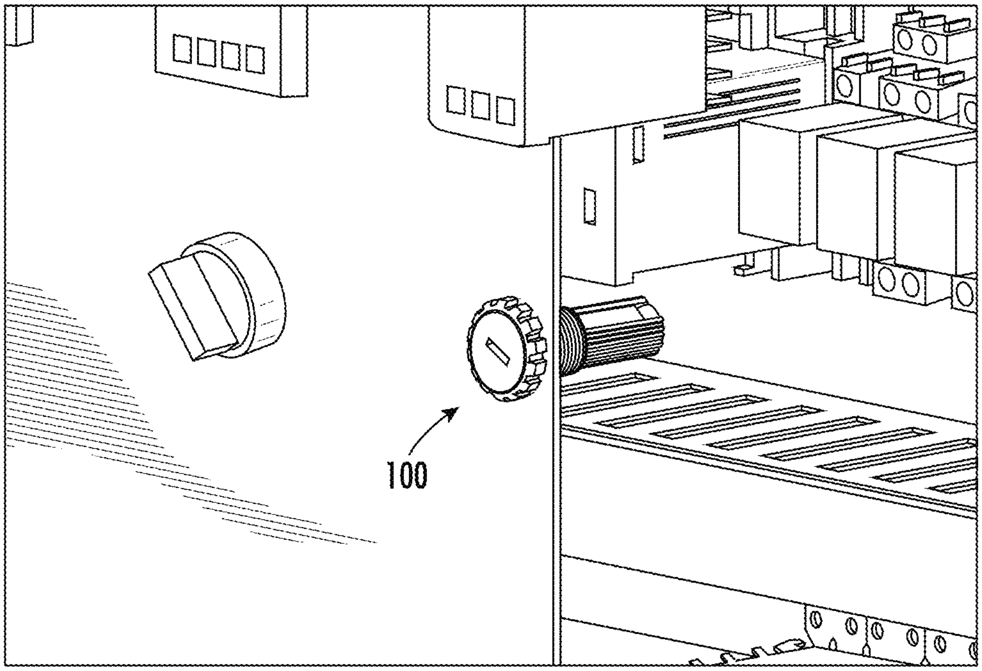
Figure 7E:
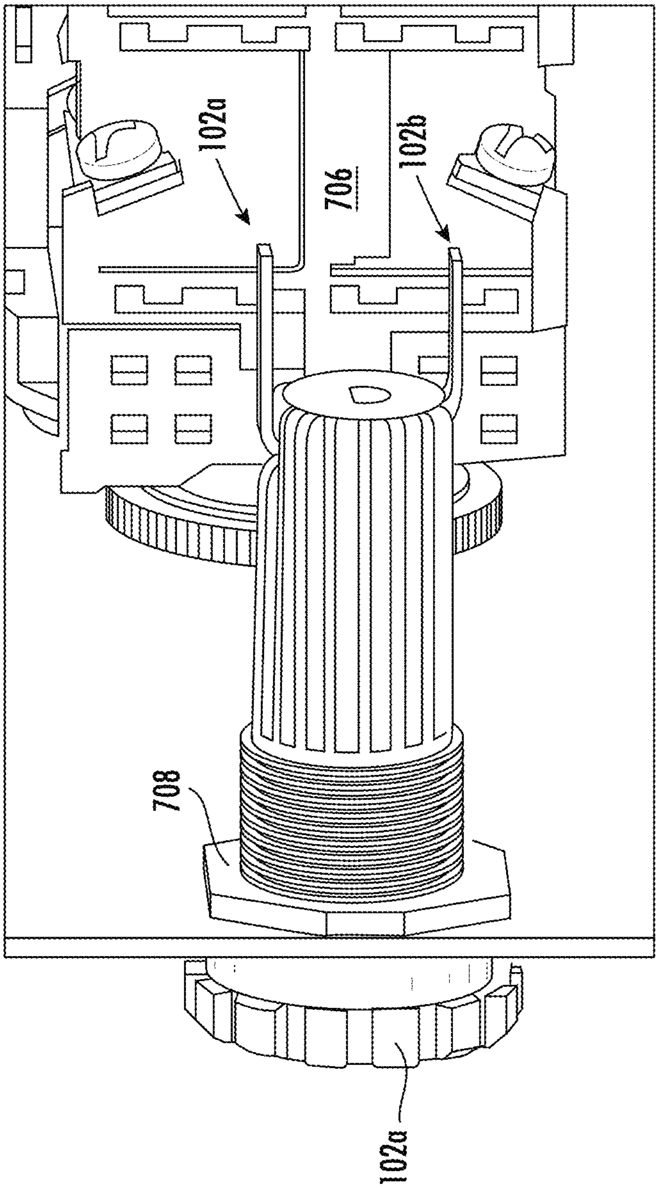

FIGS. 7A-7E are representative drawings of a control panel 700 for use with the fuse holder 100, according to exemplary embodiments. FIG. 7A is a perspective view of the control panel 700, FIG. 7B is a detailed perspective view of the control panel, FIG. 7C is a perspective cross-sectional view of the control panel, FIG. 7D is a detailed perspective cross-sectional view with the fuse holder 100, and FIG. 7E is a detail side view of the control panel with the fuse holder. The control panel 700 contains buttons and knobs on the outside of the panel and circuitry to be protected by the fuse inside the fuse holder 100.

In some embodiments, the fuse holder 100 is designed to be installed on a control panel, such as the control panel 700, for controlling machines, universal power supplies, and so on. A detail indicator 702 from FIG. 7A is reflected in FIG. 7B, in which a panel hole 704 for holding the fuse holder 100 is shown. The fuse holder 100 is installed from the front (outside) of the control panel 700, through the dedicated panel hole 704. The fuse holder 100 is passed through the panel hole 704, then fixed in place with a nut 708 (FIG. 7E), where the nut is threaded through the screw threads 118 (FIG. 1) of the housing 104 of the fuse holder. The terminals 102 are connected to a protected circuit 706 for providing overload protection.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure is not limited to the described embodiments, but that it has the full scope defined by the language of the following claims, and equivalents thereof.

The invention claimed is:

1. A fuse holder comprising:

a housing comprising a telescoping chamber adapted to receive a knob terminal, wherein the knob terminal is adapted to hold a fuse; and a knob comprising a neck, wherein the neck is inserted into the telescoping cavity and enclosing the cylindrical fuse;

the telescoping chamber further comprising:

a first chamber disposed adjacent a head of the housing, wherein the neck is inserted through the head;

a second chamber disposed adjacent the first chamber;

a third chamber disposed adjacent the second chamber, wherein the second chamber is in between the first chamber and the third chamber; and a fourth chamber adjacent the third chamber;

a first terminal to connect to a first side of the knob terminal inside the telescoping chamber, the first terminal further comprising:

a slot section adapted to be inserted into a slot of the housing, the slot section to bisect the third chamber and the fourth chamber; and a protruding section extend laterally outside the housing, wherein the slot section is orthogonal to the protruding section; and a second terminal to connect to the knob terminal inside the telescoping chamber.

2. The fuse holder of claim 1, the housing further comprising a plurality of fins axially radiating from an outside surface of the housing.

3. The fuse holder of claim 1, the knob further comprising a plurality of fin axially radiating from an outside surface of the knob.

4. The fuse holder of claim 1, wherein the first chamber, the second chamber, and the third chamber are cylindrical.

5. The fuse holder of claim 1, wherein the first chamber has a first diameter, the second chamber has a second diameter, and the third chamber has a third diameter, wherein the first diameter is larger than the second diameter and the second diameter is larger than the third diameter.

6. The fuse holder of claim 1, the second terminal further comprising:

a protruding section to extend laterally outside the housing; and a cylindrical section adapted to be inserted into a cylindrical slot of the housing, wherein the cylindrical slot is an extension of the second chamber and adjacent the third chamber.

7. The fuse holder of claim 6, the housing further comprising a terminal pathway disposed between the second chamber and an outside of the housing, wherein the protruding section is fed through the terminal pathway.

8. A fuse holder comprising:

a knob; and a housing comprising:

a telescoping chamber to hold a knob terminal, the telescoping chamber further comprising:

a first chamber for holding a neck of the knob;

a second chamber adjacent the first chamber, the second chamber comprising the second slot;

a third chamber adjacent the second chamber, the second chamber for holding the cylindrical fuse; and a fourth chamber adjacent the third chamber, wherein the third chamber is between the second chamber and the fourth chamber;

wherein the knob terminal is adapted to hold a fuse;

a cylindrical head disposed adjacent the telescoping chamber, the cylindrical head to receive the knob, the knob to enclose the telescoping chamber;

a first slot for receiving a first terminal, wherein the first slot is orthogonal to the telescoping chamber; and a second slot for receiving a second terminal, wherein the second slot holds a cylindrical section of the second terminal.

9. The fuse holder of claim 8, wherein the first slot bisects the telescoping chamber between the third chamber and the fourth chamber.

10. The fuse holder of claim 8, wherein the second slot is an extension of the second chamber that surrounds the third chamber.

11. The fuse holder of claim 8, wherein:

the first chamber has a first diameter;

the second chamber has a second diameter, smaller than the first diameter;

the third chamber has a third diameter smaller than the second diameter; and the fourth chamber has a fourth diameter smaller than the third diameter.

12. The fuse holder of claim 8, the second terminal further comprising a neck section adjacent the cylindrical section, an angled section adjacent the neck section, and a protruding section, wherein the protruding section extends radially outward from the housing.

13. The fuse holder of claim 12, the housing further comprising a terminal pathway, wherein the terminal pathway is a cavity extending from the second chamber to outside the housing.

14. The fuse holder of claim 13, wherein the protruding section and angled section of the second terminal are inserted into the terminal pathway until the protruding section extends radially outward from the housing.

15. The fuse holder of claim 8, wherein the housing further comprises a plurality of fins radiating axially outward from a surface of the housing.

16. The fuse holder of claim 8, wherein the knob further comprises a plurality of fins radiating axially outward from a surface of the knob.

* * * * *